United States Patent
Kim et al.

(10) Patent No.: US 9,340,419 B2
(45) Date of Patent: May 17, 2016

(54) REGENERATION METHOD OF RAW MATERIALS FOR HYDROGEN SUPPLY SYSTEM OF FUEL CELL

(71) Applicants: HYUNDAI MOTOR COMPANY, Seoul (KR); The Industry & Academic Cooperation in Chungnam National University (IAC) of Chungnam University, Daejeon (KR)

(72) Inventors: Chang Ho Kim, Yongin-si (KR); Inchul Hwang, Seoul (KR); Hyung Ki Kim, Seoul (KR); Seong Seock Cho, Daejeon (KR); Jong Hyeon Lee, Daejeon (KR); Moon Hee Han, Daejeon (KR); Hong Youl Ryu, Jecheon-si (KR); Dae-Young Kim, Sejong-si (KR)

(73) Assignees: HYUNDAI MOTOR COMPANY, Seoul (KR); The Industry & Academic Cooperation in Chungnam National University (IAC), Daejeon (KR)

( * ) Notice: Subject to any disclaimer, the term of this patent is extended or adjusted under 35 U.S.C. 154(b) by 0 days.

(21) Appl. No.: 14/552,084

(22) Filed: Nov. 24, 2014

(65) Prior Publication Data

US 2015/0175415 A1 Jun. 25, 2015

(30) Foreign Application Priority Data

Dec. 20, 2013 (KR) ........................ 10-2013-0160456

(51) Int. Cl.
*C01B 3/02* (2006.01)
*C01B 3/08* (2006.01)
(Continued)

(52) U.S. Cl.
CPC ... *C01B 3/08* (2013.01); *C01F 7/00* (2013.01); *H01M 8/065* (2013.01); *H01M 2250/20* (2013.01); *Y02E 60/36* (2013.01); *Y02E 60/50* (2013.01); *Y02T 90/32* (2013.01)

(58) Field of Classification Search
USPC ...................................... 423/648.1
See application file for complete search history.

(56) References Cited

U.S. PATENT DOCUMENTS 4,599,465 A * 7/1986 Tamaru et al. ................. 568/781
5,120,513 A * 6/1992 Moody et al. ................. 423/111
(Continued)

FOREIGN PATENT DOCUMENTS

KR 10-2014-0053730 A 5/2014
WO 02/083989 A1 10/2002

OTHER PUBLICATIONS

Xiao Y. Yan et al.,: "Direct electrolytic reduction of solid alumina using molten calcium chloride-alkali chloride electrolytes", J Appl Electrochem (2009) 39, pp. 1349-1360.
(Continued)

*Primary Examiner* — Melvin C Mayes
*Assistant Examiner* — Kenneth Vaden
(74) *Attorney, Agent, or Firm* — McDermott Will & Emery LLP

(57) ABSTRACT

Disclosed is a method and related system of regenerating a raw material for a hydrogen supply system of a fuel cell. The method includes reacting aluminum and a metal hydroxide to produce hydrogen in the hydrogen supply system of a fuel cell; and recovering an aluminum compound produced simultaneously with the hydrogen in the reaction. An aluminum hydroxide is obtained from the aluminum compound. The aluminum hydroxide is heat-treated to obtain an aluminum oxide. The aluminum oxide is reduced to obtain aluminum. The obtained aluminum is re-supplied as a raw material for producing the hydrogen.

17 Claims, 7 Drawing Sheets

(51) Int. Cl.
*H01M 8/06* (2016.01)
*C01F 7/00* (2006.01)

(56) References Cited

U.S. PATENT DOCUMENTS

2002/0081235 A1* 6/2002 Baldwin et al. ............... 422/105
2004/0115125 A1* 6/2004 Andersen ...................... 423/657
2009/0252671 A1* 10/2009 Fullerton ...................... 423/657

OTHER PUBLICATIONS

Hayrapetyan, S.S. et al., "Precipitation of Aluminum Hydroxide From Sodium Aluminate, by Treatment With Formalin, and Preparation of Aluminum Oxide", ACTA Chromatographica, No. 16, pp. 192-203 (2006).

* cited by examiner

REGENERATION METHOD OF RAW MATERIALS FOR HYDROGEN SUPPLY SYSTEM OF FUEL CELL

CROSS-REFERENCE TO RELATED APPLICATION

This application claims priority to and the benefit of Korean Patent Application No. 10-2013-0160456 filed in the Korean Intellectual Property Office on Dec. 20, 2013, the entire contents of which are incorporated herein by reference.

TECHNICAL FIELD

The present application discloses a regeneration method of a raw material for a fuel cell hydrogen supply system.

BACKGROUND

The fuel cell system mounted in the fuel cell vehicle includes a hydrogen supply system for supplying hydrogen (fuel) into a fuel cell stack. An air supplying system supplies oxygen in air as an oxidant required for the electrochemical reaction to the fuel cell stack. A fuel cell stack generates electricity by the electrochemical reaction of hydrogen and oxygen. A heat and water controlling system controls the operation temperature of the fuel cell stack while simultaneously removing heat of the electrochemical reaction of the fuel cell stack.

The hydrogen supply system may use, for example, a mechanism of producing hydrogen through a chemical reaction of aluminum and a metal hydroxide aqueous solution. In this case, the aluminum compound is discharged in a liquid phase while simultaneously producing hydrogen in the reaction. In addition, aluminum is continuously added to produce hydrogen.

Thus, the hydrogen supply system is required to economically treat the waste and to continuously supply the aluminum raw material.

SUMMARY

The present application provides a method of regenerating a raw material for a hydrogen supply system of a fuel cell in an economical and environment-friendly manner.

One embodiment of the present application provides a method of regenerating a raw material for a hydrogen supply system of fuel cell. The method includes reacting aluminum and a metal hydroxide to produce hydrogen; and recovering an aluminum compound simultaneously produced with hydrogen in the reaction. An aluminum hydroxide is obtained from the aluminum compound simultaneously produced with hydrogen. The aluminum hydroxide is heat-treated to obtain an aluminum oxide; and the aluminum oxide is reduced to obtain aluminum. The obtained aluminum is re-supplied as a raw material for the producing of hydrogen.

The step of reacting aluminum and metal hydroxide to produce hydrogen may be performed in, specifically, the hydrogen supply system in the fuel cell vehicle.

The metal hydroxide may be a sodium hydroxide.

The produced aluminum compound may be a sodium aluminum hydroxide.

The step of obtaining an aluminum hydroxide from the aluminum compound may include, specifically, adding carbon dioxide into the sodium aluminum hydroxide to obtain an aluminum hydroxide.

More specifically, the method of regenerating a raw material for a hydrogen supply system of a fuel cell may further include obtaining a sodium carbonate simultaneously with obtaining the aluminum hydroxide by adding carbon dioxide into the sodium aluminum hydroxide and obtaining a sodium hydroxide from the sodium carbonate. The sodium hydroxide is re-supplied as a raw material of the fuel cell.

In the step of heat-treating the aluminum hydroxide to obtain an aluminum oxide, the heat treatment may be performed at about 600° C. to about 800° C.

In the step of heat-treating the aluminum hydroxide to obtain an aluminum oxide, the heat treatment may be performed for about 5 to about 15 hours.

The step of reducing of the aluminum oxide to obtain aluminum may be performed by an electrolyte reduction of aluminum oxide using Ca ions.

The electrolyte reduction of aluminum oxide using Ca ions may use an electrolyte including CaO.

In the electrolyte, the CaO may have a concentration of about 0.1 to about 1 mass %.

The electrolyte reduction of aluminum oxide using Ca ions may be represented by the following reaction scheme:

[Negative Electrode Reaction]

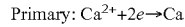

Primary: $Ca^{2+} + 2e \rightarrow Ca$

Secondary: $3Ca + Al_2O_3 \rightarrow 3CaO + 2Al$

[Positive Electrode Reaction]

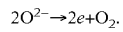

$2O^{2-} \rightarrow 2e + O_2$.

The electrolyte reduction of aluminum oxide using Ca ions may be performed at about 400° C. to about 600° C.

In the electrolyte reduction of aluminum oxide using Ca ions, the reduction may be performed by attaching the aluminum oxide onto the aluminum surface.

The step of reacting aluminum and metal hydroxide to produce hydrogen may include adding aluminum into a metal hydroxide aqueous solution. In this case, the metal hydroxide aqueous solution added with aluminum may have a concentration of about 20% to about 35%.

In the step of reacting aluminum and metal hydroxide to produce hydrogen, about 3.3 to about 7.5 parts by mole of metal hydroxide may be reacted with about 3 parts by mole of the aluminum.

Another embodiment of the present application provides a raw material regenerating system of a hydrogen supply system of a fuel cell. The system includes a hydrogen supplying part of a fuel cell vehicle in which aluminum and a metal hydroxide are reacted to produce hydrogen and an aluminum compound. A regenerating part is provided in which the aluminum compound produced in the hydrogen supplying part is recovered to regenerate the aluminum compound into an aluminum metal. The regenerated aluminum metal is re-supplied as a raw material to the hydrogen supplying part of the fuel cell vehicle.

The regenerating part may be mounted outside of the fuel cell vehicle.

The regenerating part performs the chemical reaction for regenerating the aluminum compound to the aluminum metal. The chemical reaction may include: obtaining an aluminum hydroxide from the aluminum compound; heat-treating the aluminum hydroxide to obtain an aluminum oxide; and reducing the aluminum oxide to obtain aluminum.

The reducing the aluminum oxide to obtain aluminum may be performed by, specifically, an electrolyte reduction of aluminum oxide using Ca ions.

The electrolyte reduction of aluminum oxide using Ca ions may use an electrolyte including CaO having a concentration of about 0.1 to about 1 mass %.

In the electrolyte reduction of aluminum oxide using Ca ions, the reduction may be performed by attaching the aluminum oxide onto the aluminum surface.

The hydrogen supplying part of a fuel cell vehicle is used to produce hydrogen and an aluminum compound through the reaction of aluminum and a metal hydroxide, and about 3.3 to about 7.5 parts by mole of the metal hydroxide may be reacted with about 3 parts by mole of the aluminum.

Other embodiments of the present application are included in the following detailed description. Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

The method of regenerating a raw material for the fuel cell hydrogen supply system and the raw material regenerating system according to one embodiment may provide a fuel cell hydrogen supply system in an economical and environment-friendly manner.

DETAILED DESCRIPTION

Hereinafter, embodiments of the present application are described in detail. However, these embodiments are exemplary, and this disclosure is not limited thereto.

The hydrogen supply system of fuel cell may use, for example, a mechanism for producing hydrogen through a chemical reaction of aluminum and a metal hydroxide. In this case, the aluminum compound is discharged as a waste product while simultaneously producing hydrogen, so it needs to be treated. In addition, as the aluminum raw material is consumed in the hydrogen supply system of fuel cell, the aluminum raw material is required to be continuously supplied.

Thus, one embodiment provides a method of recycling the aluminum compound waste into an aluminum raw material. Thereby, an economical and environment-friendly hydrogen supply system of a fuel cell vehicle may be provided.

One embodiment of the present application provides a method of regenerating a raw material including: reacting aluminum and a metal hydroxide to produce hydrogen; and recovering an aluminum compound simultaneously produced with hydrogen in the reaction. An aluminum hydroxide is obtained from the aluminum compound simultaneously produced with hydrogen. The aluminum hydroxide is heat-treated to provide an aluminum oxide. The aluminum oxide is reduced to provide aluminum. The obtained aluminum is re-supplied to the raw material for producing hydrogen.

Figure 1:
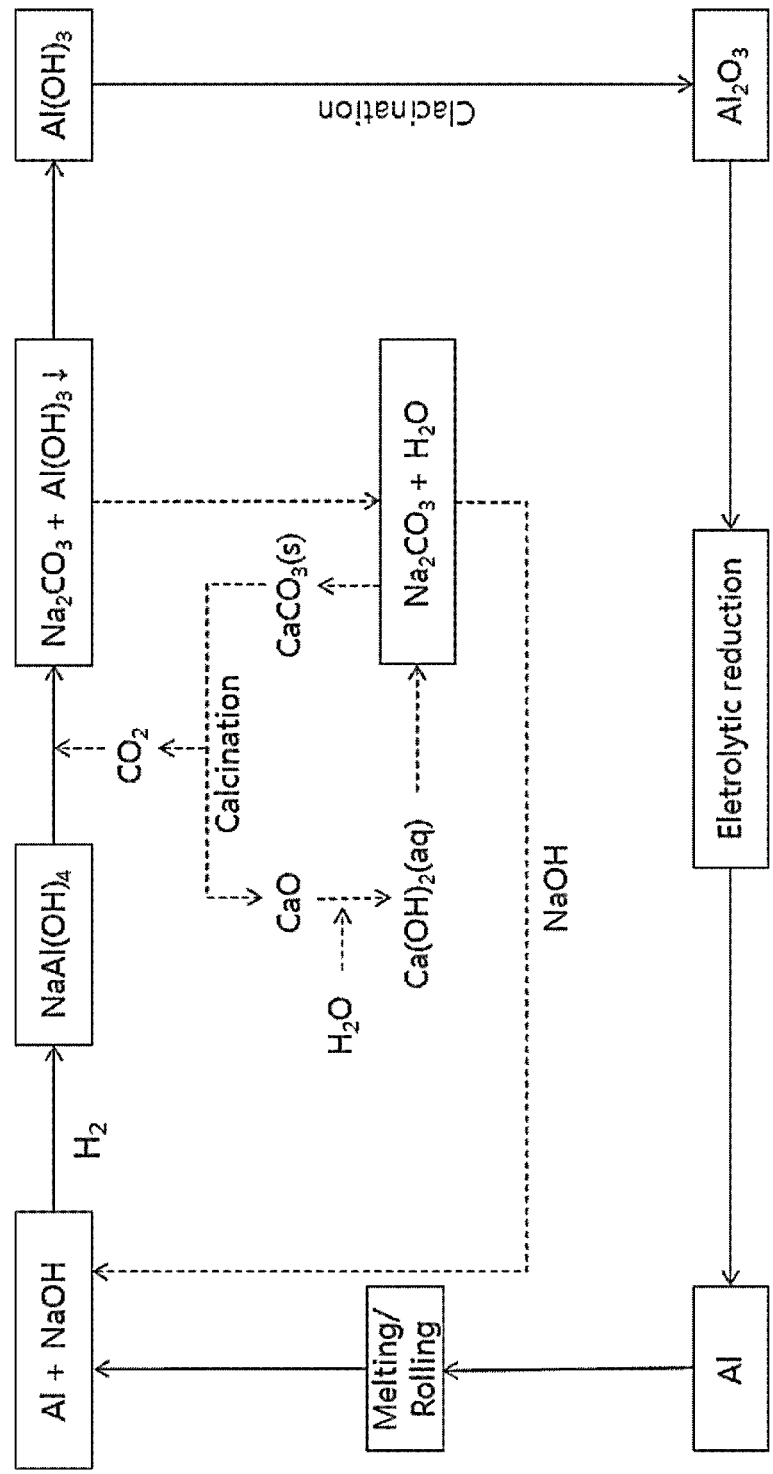
FIG. 1 is a schematic view showing a method of regenerating a raw material for a fuel cell hydrogen supply system according to one embodiment.

FIG. 1 schematically shows a method of regenerating a raw material for a fuel cell hydrogen supply system according to one embodiment.

The step of reacting aluminum and metal hydroxide to produce hydrogen may be performed inside a fuel cell vehicle. In other words, the hydrogen supply system may be present inside of the fuel cell vehicle. The regenerating the recovered aluminum compound into aluminum may be carried out outside of the vehicle. The process of re-supplying the regenerated aluminum into a fuel cell vehicle to produce hydrogen may be repeated.

In other words, the method of regenerating a raw material according to one embodiment may be a method of regenerating a raw material for a hydrogen supply system of a fuel cell vehicle, specifically, a method of regenerating an aluminum raw material for a hydrogen supply system of a fuel cell vehicle.

Specifically, one embodiment provides a method of regenerating a raw material for a hydrogen supply system of fuel cell vehicle including: reacting aluminum and a metal hydroxide in a hydrogen supplying part of a fuel cell vehicle to produce hydrogen; and recovering an aluminum compound simultaneously produced with hydrogen in the reaction. An aluminum hydroxide is obtained from the aluminum compound simultaneously produced with hydrogen. The aluminum hydroxide is heat-treated to obtain an aluminum oxide. The aluminum oxide is reduced to obtain aluminum. The obtained aluminum is re-supplied as a raw material for a hydrogen supplying part of the fuel cell vehicle.

A metal hydroxide, which is a reactant in the hydrogen producing step, may be, for example, sodium hydroxide (NaOH). In this case, hydrogen is generated by performing the reaction such as Reaction Scheme 1, and simultaneously, a sodium aluminum hydroxide may be produced.

[Reaction Scheme 1]

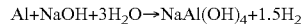

$$Al + NaOH + 3H_2O \rightarrow NaAl(OH)_4 + 1.5H_2$$

The aluminum may be synthesized in a form of $Al(OH)_3$ besides $NaAl(OH)_4$. In other words, a liquid sodium aluminum hydroxide is produced through the reaction, and a solid $Al(OH)_3$ may be precipitated according to the condition. Accordingly, the aluminum compound simultaneously produced with hydrogen may be $NaAl(OH)_4$, $Al(OH)_3$, or a combination thereof.

After recovering the aluminum compound simultaneously produced with hydrogen, the sodium aluminum hydroxide is required to be converted to an aluminum hydroxide. For example, carbon dioxide is added into the sodium aluminum hydroxide to obtain the aluminum hydroxide.

Specifically, a $Na_2CO_3$ aqueous solution and an $Al(OH)_3$ precipitate may be obtained by transmitting $CO_2$ through a $NaAl(OH)_4$ aqueous solution.

On the other hand, the obtained sodium carbonate ($Na_2CO_3$) is reacted with water to be converted into NaOH, and NaOH may be recycled as a raw material (metal hydroxide) in the producing of the hydrogen.

The obtained aluminum hydroxide ($Al(OH)_3$) is converted into an aluminum oxide ($Al_2O_3$) by the heat treatment.

The heat treatment may be performed at about 600° C. to about 800° C., specifically at about 650° C. to about 800° C., about 600° C. to about 750° C., or about 650° C. to about 750° C. In this case, aluminum oxide may be obtained in a high yield.

In addition, the heat treatment may be performed for about 5 to about 15 hours, specifically about 6 to about 14 hours, or about 7 to about 13 hours. In this case, the aluminum oxide may be effectively formed.

Figure 2:
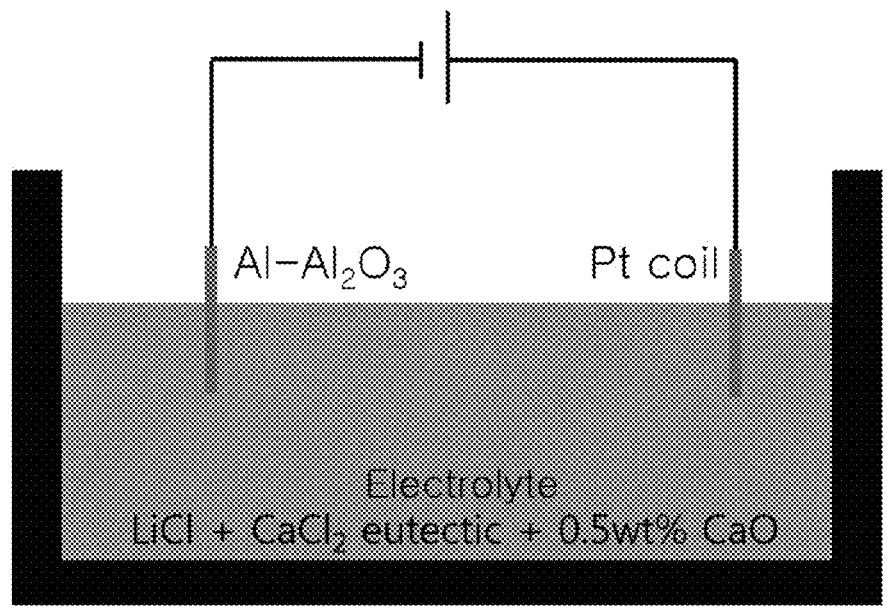
FIG. 2 is a view showing a process of reducing aluminum oxide according to one embodiment.

The reducing of the aluminum oxide to obtain aluminum may be performed through, specifically, an electrolyte reduction of aluminum oxide using Ca ions. The electrolyte reduction is a method of reducing $Al_2O_3$ to Al by electrically depositing Ca. FIG. 2 is a view showing a process of reducing aluminum oxide according to one embodiment.

Referring to FIG. 2, the reduction may use an electrolyte including CaO as an electrolyte, and specifically, may use an electrolyte including LiCl, $CaCl_2$, and CaO.

For example, the reduction may use an electrolyte added with about 0.1 to about 1 mass % of CaO into the LiCl—$CaCl_2$ process composition. The CaO may have a concentration of, specifically, about 0.2 to about 0.9 mass %, about 0.3 to about 0.8 mass %, or for example, about 0.5 wt %.

In FIG. 2, the reference electrode is a Pt wire, the reduction electrode is a Mo wire, and the oxidation electrode is Pt. In this case, the reduction process temperature may range from about 400° C. to about 600° C.

The electrolyte reduction of aluminum oxide using the Ca ions may be represented by the following negative electrode reaction scheme and the following positive electrode reaction scheme.

[Negative Electrode Reaction]

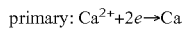
primary: $Ca^{2+}+2e \rightarrow Ca$

secondary: $3Ca+Al_2O_3 \rightarrow 3CaO+2Al$

[Positive Electrode Reaction]

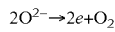
$2O^{2-} \rightarrow 2e+O_2$

The CaO oxidized in the negative electrode is dissolved in an electrolyte.

Figure 3:
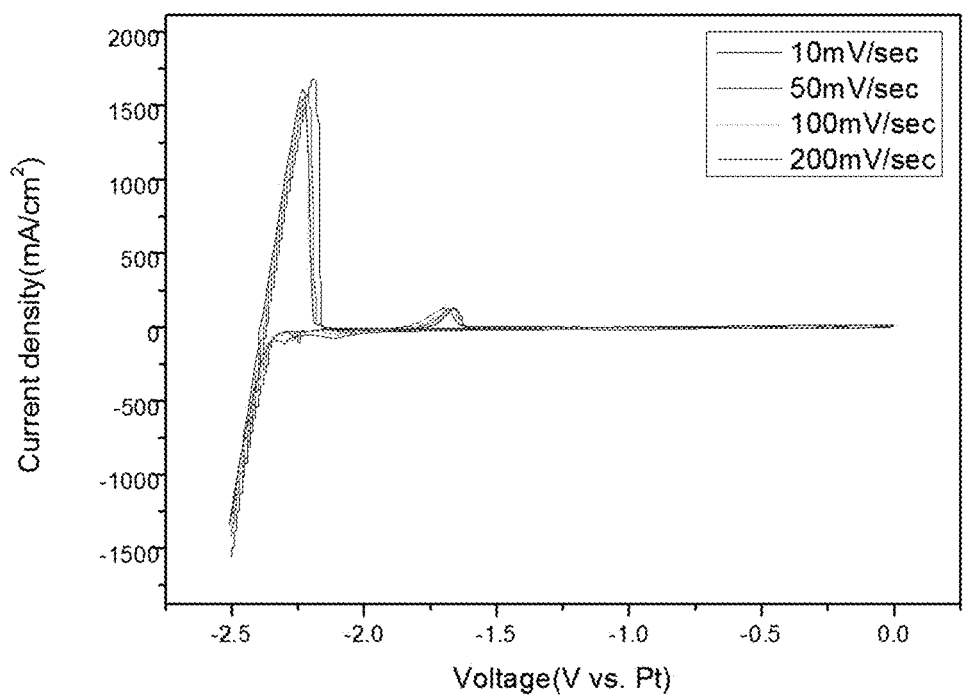
FIG. 3 is a cyclic voltammetry curve of an electrolyte reduction of aluminum oxide according to one embodiment.

In the electrolyte reduction using Ca ions, the redox potential of Ca ions in the electrolyte is the most important. In order to evaluate this, it is confirmed that the redox potential is about −2.35 V relative to the Pt reference electrode using the opposite electrode of Pt and the operation electrode of the Mo Wire according to cyclic voltammetry. FIG. 3 shows a cyclic voltammetry curve according to this process.

In addition, in the case of electrolyte reduction, it is important to ensure the electrical conductivity of aluminum oxide which is a non-conductor. Conventionally, the electrical conductivity is ensured by, for example, putting an aluminum oxide tube in a niobium basket to induce only the reaction on the contact interface where the niobium basket and the aluminum oxide contact.

According to one embodiment, in order to ensure the conductivity of the aluminum oxide, the reduction reaction may be performed by attaching aluminum oxide to the surface of aluminum. In this case, the reduced aluminum may be obtained in a high yield and a fast speed.

On the other hand, the reacting aluminum with a metal hydroxide to produce hydrogen may include, specifically, adding aluminum into a metal hydroxide aqueous solution.

As mentioned in above, according to Reaction Scheme 1, Al, NaOH, and $H_2O$ may be reacted to produce $NaAl(OH)_4$ and $H_2$. However, $Al(OH)_3$ may be generated instead of $NaAl(OH)_4$ depending upon the reaction conditions. The solid $Al(OH)_3$ may remain inside of the reactor when fuel is re-injected after operating the fuel cell system thereby causing a problem, or may be an inhibitor by clogging a drain.

One embodiment provides an appropriate concentration ratio of aluminum and a metal hydroxide for suppressing the precipitation of $Al(OH)_3$ and providing only liquid $NaAl(OH)_4$ in order to facilitate injecting a raw material and exhausting a reactant.

Specifically, the concentration of the metal hydroxide aqueous solution added with aluminum may range from about 20% to about 35%. Specifically, the concentration may range from about 20% to about 30% or about 25% to about 30%. In this case, the speed of generating hydrogen is faster, and the precipitate does not occur.

In addition, the metal hydroxide may be reacted at about 3.3 to about 7.5 parts by mole relative to about 3 parts by mole of the aluminum. Specifically, the mole ratio of the metal hydroxide relative to about 3 parts by mole of the aluminum may range from about 3.3 to about 7 parts by mole, from about 3.3 to about 6.5 parts by mole, or from about 3.3 to about 6 parts by mole. In this case, the speed of producing hydrogen is the fastest, and the precipitate is not generated.

Another embodiment of the present invention provides a system of regenerating a raw material for a hydrogen supply system of a fuel cell according to the method of regenerating a raw material.

Specifically, one embodiment provides a system of regenerating a raw material including a hydrogen supplying part of a fuel cell vehicle for reacting aluminum and a metal hydroxide to produce hydrogen and an aluminum compound. A regenerating part regenerates the aluminum compound to an aluminum metal by recovering the aluminum compound produced in the hydrogen supplying part. The regenerated aluminum metal is re-supplied as a raw material to the hydrogen supplying part of the fuel cell vehicle.

The supplying part may be mounted inside a fuel cell vehicle, and the regenerating part may be mounted outside the fuel cell vehicle.

In the supplying part, the reaction of producing hydrogen and the aluminum compound through the reaction of aluminum and a metal hydroxide is the same as above, so the detailed description is omitted.

The regenerating part performs the chemical reaction of regenerating the aluminum compound to the aluminum metal. The chemical reaction may include: obtaining an aluminum hydroxide from the aluminum compound; heat-treating the aluminum hydroxide to obtain an aluminum oxide; and reducing the aluminum oxide to provide aluminum.

The explanation for each step is the same as above so the details are not repeated.

According to the system of regenerating a raw material, as the aluminum compound waste generated in the hydrogen supplying part of a fuel cell vehicle may be easily recovered, and the entire amount of waste is regenerated as a raw material, the hydrogen supply system of a fuel cell vehicle may be economically operated, and the aluminum raw material may be easily supplied.

Example

A $NaAl(OH)_4$ solution was synthesized by adding 61 g of Al into 500 ml of a 26 mass % NaOH aqueous solution according to Reaction Scheme 1.

[Reaction Scheme 1]

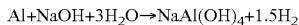

$CO_2$ was transmitted thereto, and a $Na_2CO_3$ aqueous solution and an $Al(OH)_3$ precipitate were separated. The precipitated $Al(OH)_3$ was separated through a filter and washed 3 times using distilled water.

Then the washed $Al(OH)_3$ was heated at 700° C. for 10 hours to provide $Al_2O_3$.

The $Al_2O_3$ was reduced according to the electrolyte reduction using an electrolyte added with 0.5 wt % of CaO in the $LiCl$—$CaCl_2$ process composition. The process was performed at a temperature of 500° C.

On reducing $Al_2O_3$, $Al_2O_3$ was attached to the surface of Al in order to ensure the conductivity of $Al_2O_3$.

Figure 4:
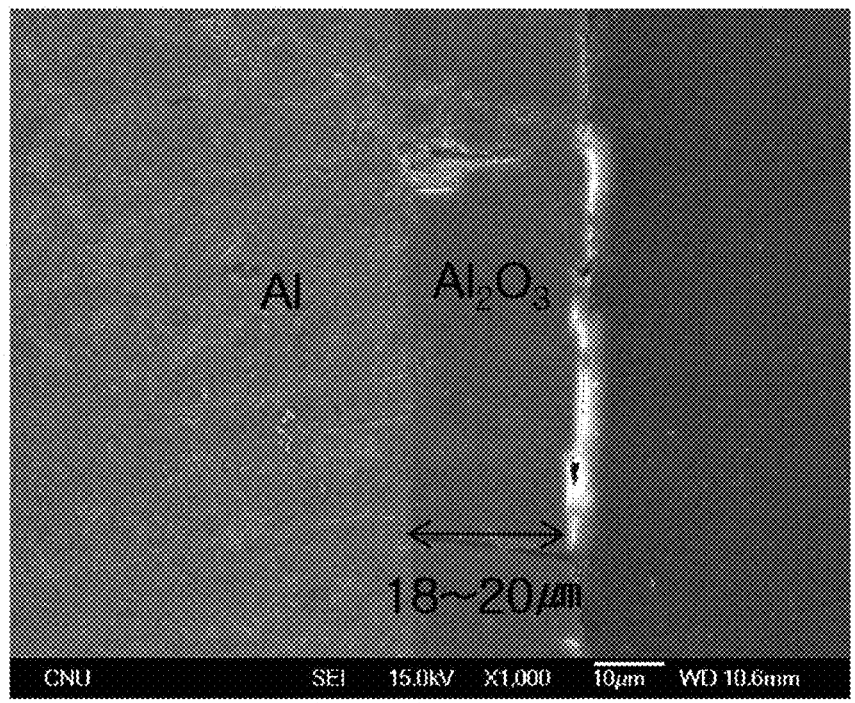
FIG. 4 is a scanning electron microscope (SEM) photograph taken after attaching an aluminum oxide to an aluminum surface according to one embodiment.
Figure 5:
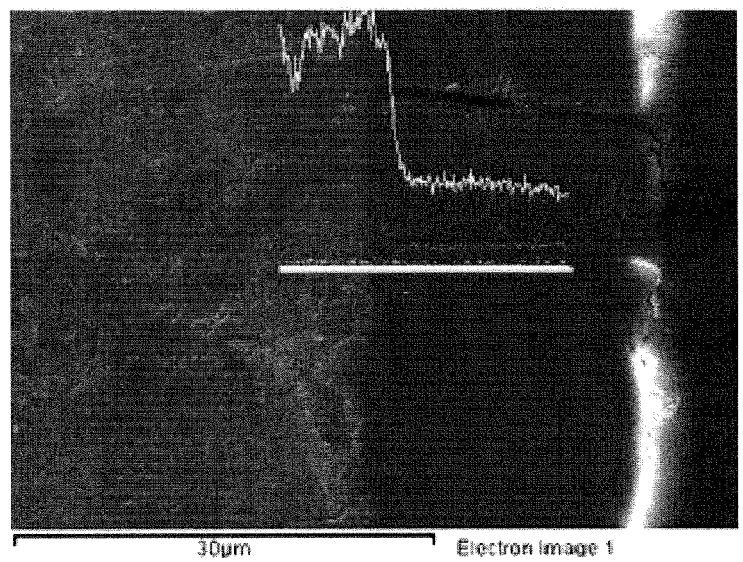
FIG. 5 shows energy dispersive spectrophotometry (EDS) results of FIG. 4.
Figure 5:
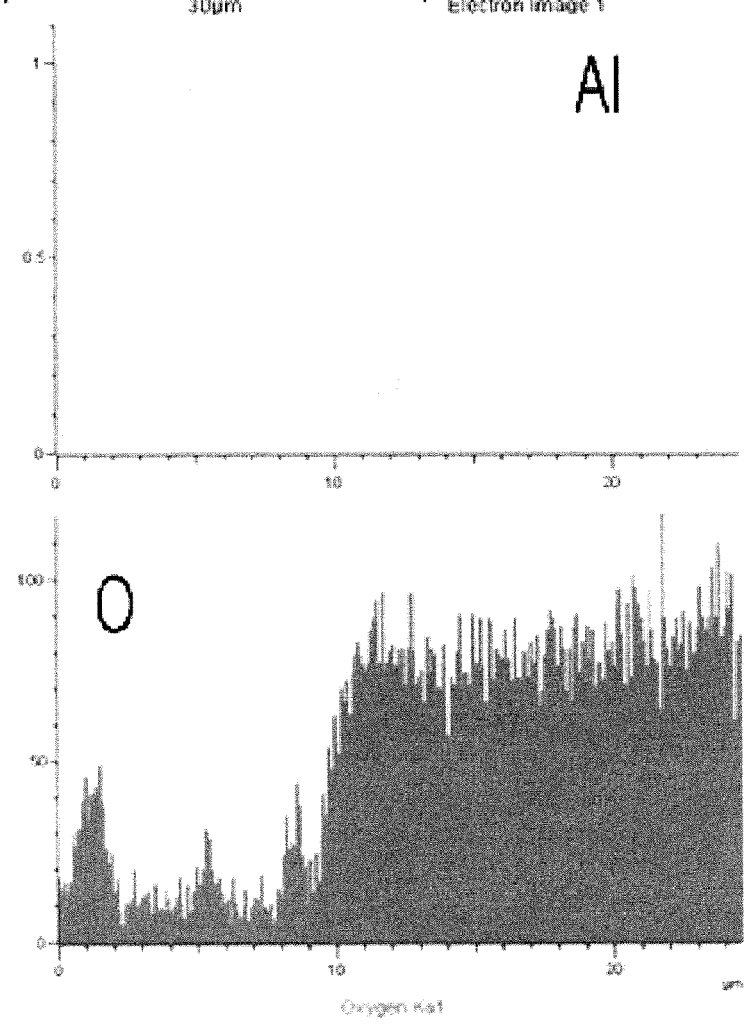

FIG. 4 is a scanning electron microscope (SEM) photograph after the attachment. FIG. 5 shows energy dispersive X-ray spectroscopy (EDS) results thereof. As shown in FIG. 4 and FIG. 5, it is confirmed that $Al_2O_3$ was attached onto the surface of Al, at a thickness of about 18-20 μm, for example.

The specimen in which $Al_2O_3$ was attached on Al was applied to a negative electrode, and a Pt coil was mounted on a positive electrode and applied with 25 mA for 20 minutes.

Figure 6:
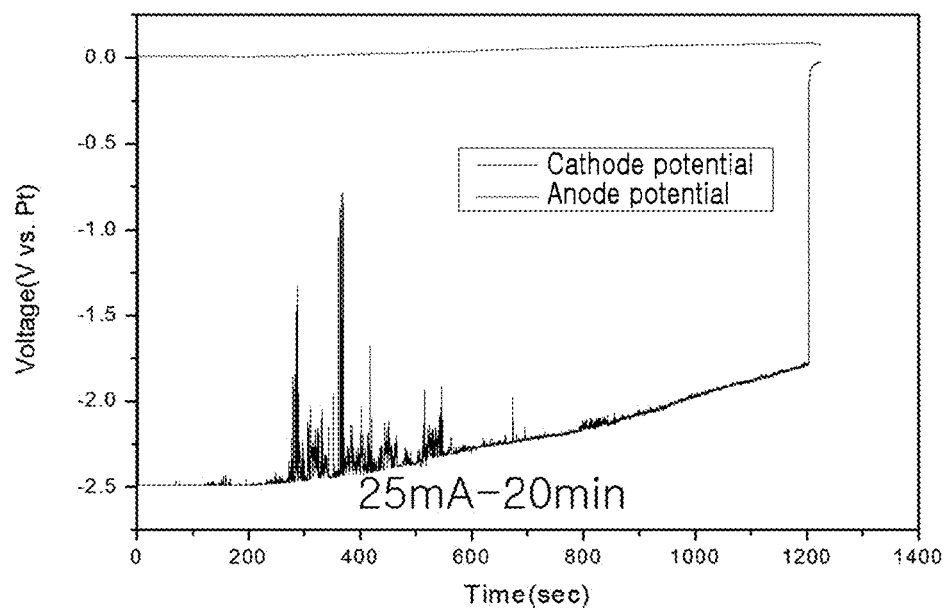
FIG. 6 is a voltage curve of a positive electrode and a negative electrode for electrolyte reduction of aluminum oxide according to examples.

FIG. 6 is a voltage curve of the positive electrode and the negative electrode. Referring to FIG. 6, it is shown that the negative electrode voltage was 0 V relative to the Pt reference electrode of the positive electrode, and that of the negative electrode was gradually increased to −2.5 V.

Figure 7:
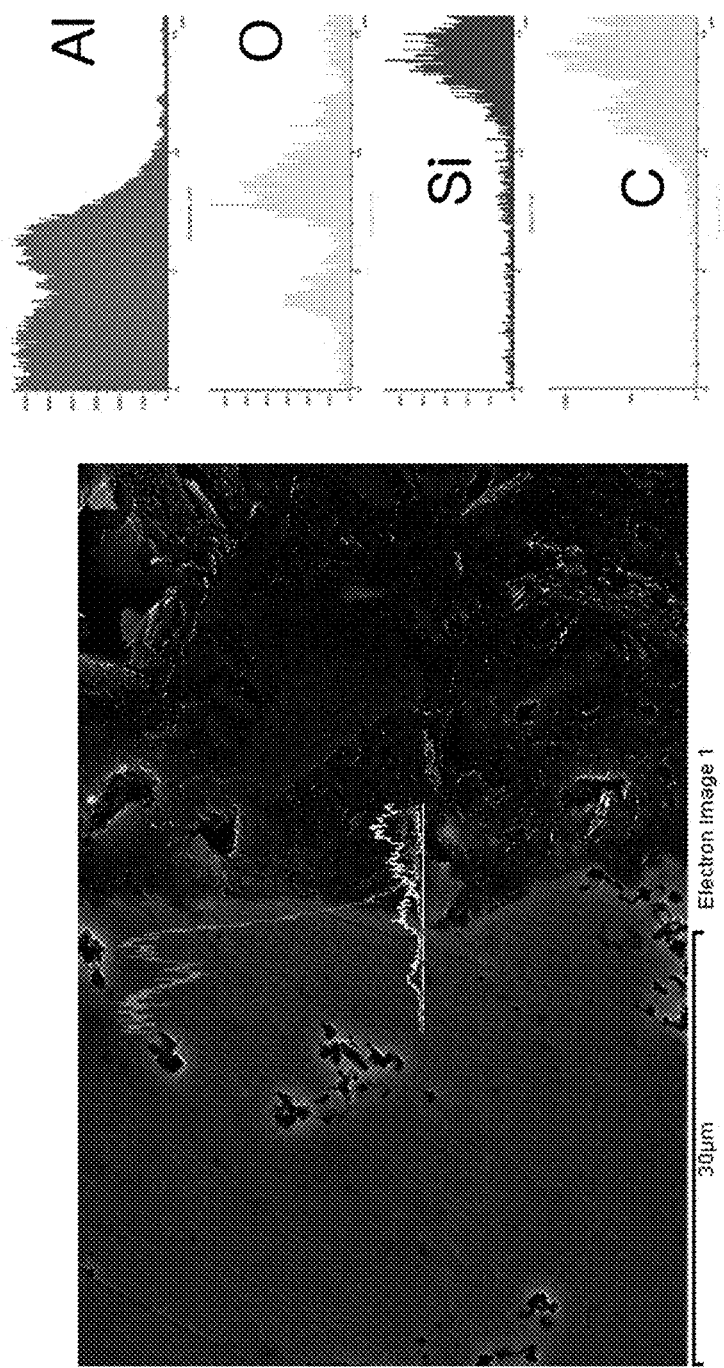
FIG. 7 shows a scanning electron microscope photograph of aluminum produced after completing the reduction of aluminum oxide and EDS analysis results.

FIG. 7 shows a scanning electron microscope photograph taken after completing the reduction, and the EDS analysis results. Referring to FIG. 7, it is confirmed that all $Al_2O_3$ regions were changed to Al on the surface of Al, and a part of O was detected. Thereby, it is confirmed that $Al_2O_3$ was reduced to Al by Ca.

On the other hand, a reaction time according to a mole ratio and a concentration (hydrogen generation time) of Al, NaOH, and $H_2O$ and the precipitate generation were measured, and the results are shown in the following Table 1.

TABLE 1

| Test No. | Concentration (%) | Al:NaOH:H₂O (mol ratio) | Reaction time | White precipitate |
|---|---|---|---|---|
| 1 | 15 | 3:3.00:37.33 | Complete X | Produced |
| 2 | 20 | 3:3.00:26.66 | Complete X | Produced |
| 3 |  | 3:3.60:32.00 | Complete X | Produced |
| 4 |  | 3:3.75:33.33 | 35 minutes | Trace amount |
| 5 |  | 3:3.90:34.66 | 30 minutes | None |
| 6 |  | 3:4.20:37.33 | 30 minutes | None |
| 7 | 25 | 3:2.66:17.77 | Complete X | Produced |
| 8 |  | 3:3.58:23.88 | 53 minutes | None |
| 9 | 26.3 | 3:4.28:22.22 | 60 minutes | None |
| 10 | 26 | 3:4.20:26.66 | 30 minutes | None |
| 11 | 35.7 | 3:6.66:26.66 | 30 minutes | None |
| 12 | 30 | 3:3.00:15.55 | 4 hours | None |
| 13 |  | 3:5.14:26.66 | 35 minutes | None |
| 14 | 35 | 3:3.23:13.33 | Complete X | Produced |
| 15 |  | 3:3.76:15.55 | 100 minutes | None |
| 16 |  | 3:5.11:21.11 | 53 minutes | None |
| 17 |  | 3:5.25:21.66 | 50 minutes | None |
| 18 |  | 3:5.78:23.88 | 40 minutes | None |
| 19 |  | 3:6.25:26.66 | 30 minutes | None |
| 20 | 40 | 3:8.00:26.66 | 17 minutes | Produced |
| 21 |  | 3:8.40:28.00 |  |  |
| 22 |  | 3:9.60:32.00 |  |  |
| 23 |  | 3:12.00:40.00 |  |  |
| 24 | 60 | 3:18.00:26.66 | Complete X | Produced |

Referring to Table 1, it is understood that the reaction speed was faster at a concentration of 20% to 35%, and the precipitate was rarely produced. In addition, it is confirmed that the reaction speed was the fastest and the precipitate was not produced when 3.3 to 7.5 parts by mole of NaOH was added relative to 3 parts by mole of Al.

As shown above, the injecting of a raw material into a hydrogen supply system of a fuel cell becomes easier and the discharging the reactant becomes easier when the reaction speed is faster, and the precipitate is not generated.

While the present application has been described in connection with what is presently considered to be practical exemplary embodiments, it is to be understood that the present application is not limited to the disclosed embodiments, but, on the contrary, is intended to cover various modifications and equivalent arrangements included within the spirit and scope of the appended claims. Therefore, the aforementioned embodiments should be understood to be exemplary but not limiting the present application in any way.

What is claimed is:

1. A method of regenerating a raw material for a hydrogen supply system of a fuel cell, the method comprising steps of:
   reacting aluminum and a metal hydroxide to produce hydrogen in a hydrogen supply system of the fuel cell;
   recovering a liquid metal aluminum compound produced simultaneously with the hydrogen in the reacting step;
   obtaining an aluminum hydroxide from the aluminum compound produced simultaneously with the hydrogen;
   heat-treating the aluminum hydroxide to obtain an aluminum oxide;
   reducing the aluminum oxide to obtain aluminum; and
   re-supplying the obtained aluminum as a raw material for producing hydrogen in the reacting step,
   wherein, the reacting step further comprises:
   adding aluminum into a metal hydroxide aqueous solution, wherein the concentration of the metal hydroxide in the aqueous solution ranges from about 20 mass % to about 35 mass %, based on a total weight of the metal hydroxide aqueous solution, and wherein about 3.3 to about 7.5 parts by mole of the metal hydroxide is reacted with about 3 parts by mole of the aluminum to suppress the production of precipitate and provide only the liquid metal aluminum compound.

2. The method of claim 1, wherein the step of reacting aluminum and metal hydroxide to produce hydrogen is performed in a hydrogen supply system of a fuel cell vehicle.

3. The method of claim 1, wherein the metal hydroxide is a sodium hydroxide.

4. The method of claim 3, wherein the aluminum compound produced simultaneously with hydrogen is a sodium aluminum hydroxide.

5. The method of claim 4, wherein the step of obtaining the aluminum hydroxide comprises:
   adding carbon dioxide to the sodium aluminum hydroxide to obtain an aluminum hydroxide.

6. The method of claim 5, further comprising:
   simultaneously obtaining a sodium carbonate in the step of adding carbon dioxide into the sodium aluminum hydroxide to obtain an aluminum hydroxide;
   obtaining a sodium hydroxide from the sodium carbonate; and
   re-supplying the sodium hydroxide as a raw material for producing the hydrogen.

7. The method of claim 1, wherein the heat-treating step is performed at about 600° C. to about 800° C.

8. The method of claim 7, wherein the heat-treating step is performed for about 5 to about 15 hours.

9. The method of claim 1, wherein the reducing step is performed through an electrolyte reduction of the aluminum oxide by adding Ca ions.

10. The method of claim 9, wherein the electrolyte reduction of the aluminum oxide with Ca ions uses an electrolyte including a CaO.

11. The method of claim 10, wherein the CaO in the electrolyte has a concentration of about 0.1 to about 1 mass %.

12. The method of claim 9, wherein the electrolyte reduction of aluminum oxide with Ca ions is represented by the following reaction schemes:

a negative electrode reaction:

primary: $Ca^{2+}+2e \rightarrow Ca$ secondary: $3Ca+Al_2O_3 \rightarrow 3CaO+2Al$, and a positive electrode reaction:

$2O^{2-} \rightarrow 2e+O_2$.

13. The method of claim 9, wherein the electrolyte reduction of aluminum oxide with Ca ions is performed at about 400° C. to about 600° C.

14. The method of claim 9, wherein, in the electrolyte reduction of aluminum oxide with Ca ions, the electrolyte reduction is performed by attaching the aluminum oxide onto a surface of the aluminum.

15. A method of regenerating a raw material for a hydrogen supply system of a fuel cell, the method comprising steps of:

reacting Al and an aqueous solution of NaOH to produce $H_2$ in a hydrogen supply system of the fuel cell;

recovering a $NaAl(OH)_4$ liquid produced simultaneously with the $H_2$ in the reacting step;

precipitating $Al(OH)_3$ from the recovered $NaAl(OH)_4$ liquid;

heat-treating the precipitated $Al(OH)_3$ to obtain $Al_2O_3$;

reducing the $Al_2O_3$ by way of an electrolyte reduction to obtain Al having a surface coated with $Al_2O_3$; and re-supplying the obtained Al as a raw material for producing $H_2$ in the reacting step, wherein, the reacting step further comprises:

adding Al into an aqueous solution of NaOH, wherein the concentration of the NaOH in the aqueous solution ranges from about 20 mass % to about 35 mass %, based on a total weight of the aqueous solution of NaOH, and wherein about 3.3 to about 7.5 parts by mole of the NaOH is reacted with about 3 parts by mole of the Al to suppress the production of precipitate and provide only the $NaAl(OH)_4$ liquid.

16. The method of claim 15, wherein the heat-treating step is performed for about 5 to about 15 hours at about 600 to about 800° C.

17. The method of claim 15, wherein the reducing of the $Al_2O_3$ by way of the electrolyte reduction includes providing Ca ions from an CaO electrolyte.

* * * * *